April 7, 1931.                G. N. WILLIAMS                1,799,343
REEL
Filed March 16, 1928

INVENTOR.
George N. Williams
Labree & Labree
ATTY'S

Patented Apr. 7, 1931

1,799,343

UNITED STATES PATENT OFFICE

GEORGE N. WILLIAMS, OF KOKOMO, INDIANA, ASSIGNOR TO CONTINENTAL STEEL CORPORATION, OF KOKOMO, INDIANA, A CORPORATION OF INDIANA

REEL

Application filed March 16, 1928. Serial No. 262,316.

This invention has reference to reels upon which wire, barb wire or like material is reeled or coiled into bundles for convenience in storage and shipment.

The invention has for its principal object to provide a reel strong and rigid in construction and of simple design to render its economic manufacture.

It has for one of its objects to provide a reel preferably formed of wire and constructed in a manner combining lightness in weight with very great strength to withstand the support of wire wound or coiled thereon and the rough usage to which such reels are subjected in handling and shipping.

The invention has for a further object to provide a reel of the character above referred to which is collapsible, the parts thereof being capable of easy separation and assembly so that when the reel has been emptied it may be dismantled and discarded, or re-assembled and used again for a like purpose.

That the invention may be more fully understood, reference is had to the accompanying drawing, illustrating a preferred embodiment of the invention, in which:—

Figure 1:
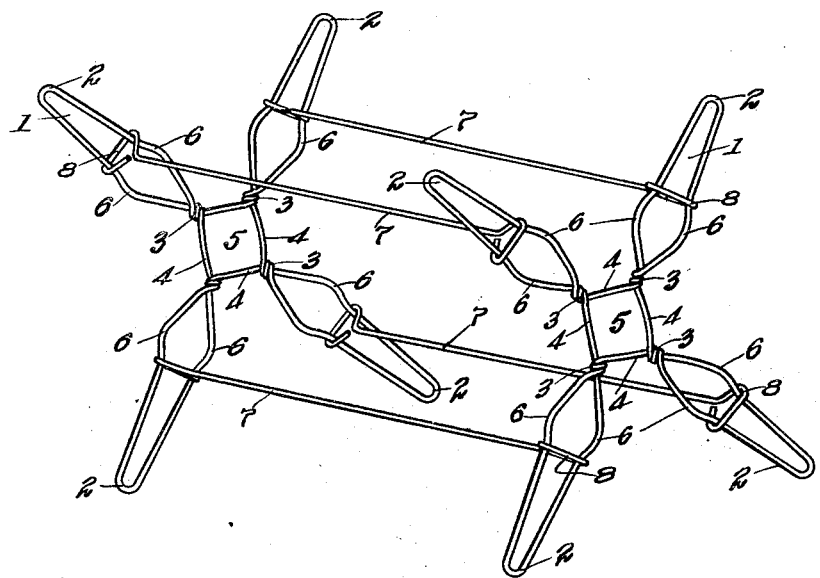
Figure 2:
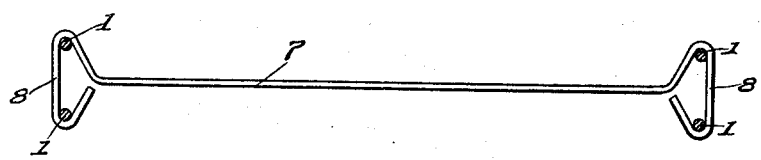

Fig. 1 is a perspective view of my improved reel shown in assembled position, and Fig. 2 is a plan view of one of the spacing or reach members with a portion of the end-members shown in section.

Like characters of reference denote corresponding parts throughout the figures.

Reference being had to the drawing, 1 designates the end-members of my improved reel which are substantially star-shaped and are formed of wire of any suitable gauge to give the required and necessary strength and rigidity, obviously needed in a structure of this character. The end members 1 are preferably formed of one piece of wire, the free ends being welded together by electricity or any other suitable method, after which step the connected wire is formed into the end members having substantially the shape and formation as shown in Fig. 1.

The end members comprise looped radial arms 2 which are twisted together at their inner ends, at 3, and the several arms 2 of each end member 1 are connected together by portions of the wire 4 forming substantially a parallelogram and providing axially aligned spindle bearing openings 5 in the end members 1. The openings 5, it will be understood, enable the reel to be placed and secured in wire reeling and unreeling positions. The radial arms 2 of the end members 1, it will be observed, are slightly tapering, and approximately midway their length are formed with a bulge or shoulder portion 6 forming a seat for the placement and positioning of tie-rods or reach members 7, see Figs. 1 and 2. The tie rods or reach members 7 are likewise formed of wire of suitable gauge and the ends of the members are bent to form loops 8, see Fig. 2, for the purpose of detachable connection with corresponding arms 2 of the end members 1.

In assembling my improved reel, the loops 8 of the tie-rods or reach members 7 are adapted to engage corresponding radial arms 2 of the end members 1 and to be seated against the shoulder portions 6 of the arms 2, see Fig. 1. It will be understood that with the reel assembled as shown in Fig. 1, and spindle means inserted and engaging the bearing portions 5 that upon reeling or coiling wire or barb wire upon the reel, such coiling and reeling of the wire or barb wire around the reel will naturally tighten and lock the tie-rods or reach members 7 upon the corresponding arms of the end members, thus securely interlocking the tie-rods and arms and forming a united structure which can bear the weight of the wire thereon without liability of collapsing, either during the reeling of the wire thereon, or during storage or shipment.

What I claim is:—

A reel including end members each of which is formed from a single piece of wire bent into star-shape, the points of the star comprising looped radial arms twisted together at their inner ends and the several arms of each end member connected together by portions of the wire in substantially the form of a parallelogram and providing axially aligned spindle openings in the end members, said twisted portions providing two pairs of diametrically opposed points of reinforcement for each of the spindle openings in the end members and further providing overlapping of the arms so as to cause the sides of the arms to mutually strengthen and brace one another and reach members connecting corresponding arms of said end members.

In witness whereof, I have hereunto affixed my hand this 13 day of March, 1928.

GEORGE N. WILLIAMS.